(12) United States Patent
Bandyopadhyay et al.

(10) Patent No.: US 9,549,280 B2
(45) Date of Patent: *Jan. 17, 2017

(54) WIRELESS DATA TRANSFER WITH IMPROVED TRANSPORT MECHANISM SELECTION

(71) Applicant: Intel Corporation, Santa Clara, CA (US)

(72) Inventors: Somdas Bandyopadhyay, Bangalore (IN); Pavana C. Kumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,825

(22) Filed: Oct. 22, 2014

(65) Prior Publication Data

US 2015/0038081 A1  Feb. 5, 2015

Related U.S. Application Data

(63) Continuation of application No. 13/536,207, filed on Jun. 28, 2012.

(51) Int. Cl.
*H04B 5/00* (2006.01)
*H04W 4/00* (2009.01)
*H04W 12/04* (2009.01)

(52) U.S. Cl.
CPC ............ *H04W 4/008* (2013.01); *H04B 5/0031* (2013.01); *H04W 12/04* (2013.01)

(58) Field of Classification Search
CPC ...... H04W 84/12; H04W 12/08; H04W 28/18; H04W 88/04; H04W 88/06; H04W 84/18; H04W 8/005; H04W 12/06; H04W 24/02; H04W 48/20; H04W 52/0209; H04W 88/08; H04W 88/10; H04W 12/04; H04W 36/18; H04W 12/00; H04W 4/008

(Continued)

(56) References Cited

U.S. PATENT DOCUMENTS 7,469,125 B2 * 12/2008 Nurmi ........................ 455/11.1
8,458,363 B2 *  6/2013 Rosenblatt ........ G06F 17/30058
                                                 709/248

(Continued)

OTHER PUBLICATIONS

Samsung, "Samsung Galaxy SIII: S Beam feature demo," posted May 4, 2012, www.phoneareana.com/news/Samsung-Galaxy-S-III-S-Beam-feature, 3 pages.

(Continued)

*Primary Examiner* — Nay A Maung
*Assistant Examiner* — Angelica M Perez
(74) *Attorney, Agent, or Firm* — Grossman, Tucker, Perreault & Pfleger, PLLC

(57) ABSTRACT

Generally, this disclosure describes devices, systems and methods for wireless data transfer with improved transport mechanism selection. The device may include a near field communication (NFC) circuit configured to initiate a data transfer between a first communication device and a second communication device; a Soft Access Point (Soft AP) data transport circuit configured to transfer data between the communication device and the second communication device; one or more additional data transport circuits configured to transfer data between the communication device and the second communication device; and a transport mechanism selection circuit coupled to the NFC interface circuit and further coupled to the one or more data transport circuits, the transport mechanism selection circuit configured to select one of the data transport circuits for the data (Continued)

transfer, wherein the selection is based on a determination of the size of the data transfer.

20 Claims, 9 Drawing Sheets

(58) Field of Classification Search
USPC .............................................. 455/41.1–41.3
See application file for complete search history.

(56) References Cited

U.S. PATENT DOCUMENTS

| | | | | |
|---|---|---|---|---|
| 8,706,037 | B1* | 4/2014 | Hamilton | H04W 76/023 455/41.1 |
| 2008/0320587 | A1* | 12/2008 | Vauclair | H04L 41/28 726/17 |
| 2009/0111378 | A1* | 4/2009 | Sheynman | H04W 8/005 455/41.1 |
| 2011/0164562 | A1* | 7/2011 | Qiu et al. | 370/328 |
| 2011/0275316 | A1* | 11/2011 | Suumaki | G06K 7/10237 455/41.1 |
| 2012/0079271 | A1* | 3/2012 | Cordeiro et al. | 713/166 |
| 2013/0036231 | A1 | 2/2013 | Suumäki | |
| 2013/0095753 | A1* | 4/2013 | Chen | H04B 5/00 455/41.1 |
| 2013/0331028 | A1 | 12/2013 | Kuehnel et al. | |
| 2014/0004793 | A1* | 1/2014 | Bandyopadhyay et al. | 455/41.1 |
| 2014/0171082 | A1* | 6/2014 | Smadi et al. | 455/436 |

OTHER PUBLICATIONS

ZTE, "ZTE debuts Touch and Share technology," Mar. 13, 2012, www.nfcworld.com/2012/03/13/314425/zte-debuts-touch- and-share-technology, 2 pages.

IEEE, "IEEE Standard for Information Technology 802.11," IEEE Computer Society, Jun. 12, 2007, 1232 pages.

IEEE, "IEEE Standard 802.16.2, Coexistence of Fixed Broadband Wireless Access System," Mar. 17, 2004, 171 pages.

IEEE, "IEEE Amendment 5: Bridging of Standard 802.16K," IEEE Standard for Local and Metropolitan Area Networks: Median Access Control (MAC) Bridges, Aug. 14, 2007, 14 pages.

IEEE, "IEEE Standard 802.16m, Amendment 3: Advanced Air Interface," Part 16: Air Interface for Broadband Wireless Access Systems, May 6, 2011, 1006 pages.

Non-Final Office Action filed in U.S. Appl. No. 13/536,207, mailed May 28, 2014, 12 pages.

Non-Final Office Action filed in U.S. Appl. No. 13/536,207, mailed Dec. 4, 2014, 13 pages.

Non-Final Office Action filed in U.S. Appl. No. 13/536,207, mailed Jun. 2, 2015, 13 pages.

Final Office Action filed in U.S. Appl. No. 13/536,207, mailed Oct. 22, 2015.

Non-Final Office Action filed in U.S. Appl. No. 13/536,207, mailed Mar. 31, 2016.

* cited by examiner

WIRELESS DATA TRANSFER WITH IMPROVED TRANSPORT MECHANISM SELECTION

REFERENCE TO PRIORITY APPLICATION

This application is a Continuation of U.S. patent application Ser. No. 13/536,207 filed Jun. 28, 2012, which is incorporated herein by reference in its entirety

FIELD

The present disclosure relates to wireless data transfer, and more particularly, to wireless data transfer with improved transport mechanism selection.

BACKGROUND

Some existing wireless communication devices enable data to be transferred between the devices by tapping them together, which is sometimes referred to as "Tap and Share." This is accomplished through the use of Near Field Communication (NFC) circuitry in the devices that detect the presence of the other device and initiate the data transfer. The data transfer is then typically performed through either NFC or Bluetooth (BT) wireless transport mechanisms. NFC and BT, however, provide slower data transfer speeds compared to other wireless transport mechanisms, making them generally unsuitable for use with large data transfers such as required, for example, with pictures or videos.

Some devices transfer data through the Cloud, but this technique also suffers from limitations on data transfer speed making it unsuitable for the transfer of larger data files. Additionally, this technique typically requires user intervention in the form of dialog prompts that must be answered, detracting from the relative ease of use that "Tap and Share" is meant to provide.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
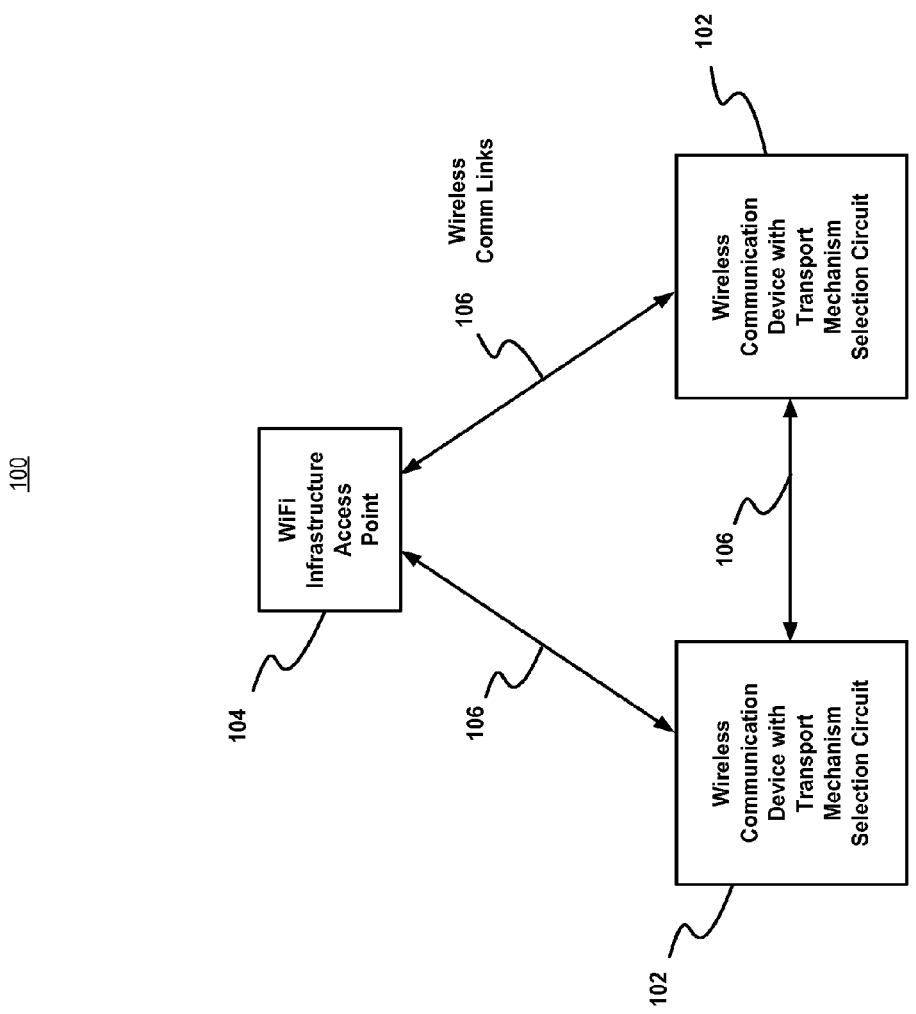
FIG. 1 illustrates a top level system diagram of one exemplary embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides apparatus, systems and methods for wireless data transfer with improved transport mechanism selection. A near field communication (NFC) circuit may initiate a data transfer between a first communication device and a second communication device based on proximity of the second device. An intelligent transport selection circuit may then chose from one or more available data transport circuits that are configured to transfer data between the first communication device and the second communication device. Data transport mechanisms available for selection may include Bluetooth (BT), Infrastructure Wireless Fidelity (WiFi), Soft Access Point (AP), WiFi-Direct, and NFC. The selection may be based on a determination of the size of the data transfer, the connection status of the devices, available credentials of the devices and the ability of the devices to temporarily disconnect from existing WiFi and/or Soft AP connections. In some embodiments the communication devices maybe part of a mobile communication device platform such as, for example, a laptop, tablet or smartphone.

The term access point (AP) as used herein, is defined as any entity that has station (STA) functionality and provides access to the distribution services, via the wireless medium (WM) for associated STAs.

The term Personal basic service set Control Point (PCP) as used herein, is defined as a STA that operates as a control point of the mm-wave network.

The term wireless network controller as used herein, is defined as a station that operates as a PCP and/or as an AP of the wireless network.

The term directional band (DBand) as used herein is defined as any frequency band wherein the Channel starting frequency is above 45 GHz.

The term DBand STA as used herein is defined as a STA whose radio transmitter is operating on a channel that is within the DBand.

The term personal basic service set (PBSS) as used herein is defined as a basic service set (BSS) which forms an ad hoc self-contained network, operates in the DBand, includes one PBSS control point (PCP), and in which access to a distribution system (DS) is not present but an intra-PBSS forwarding service is optionally present.

The term scheduled service period (SP) as used herein is scheduled by a quality of service (QoS) AP or a PCP. Scheduled SPs may start at fixed intervals of time, if desired.

The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Types of WPAN stations intended to be within the scope of the present invention include, although are not limited to, stations capable of operating as a multi-band stations, stations capable of operating as PCP, stations capable of operating as an AP, stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a smartphone, a digital television, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing Wireless HDTM and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments ("the IEEE 802.11 standards"), IEEE 802.16 standards for Worldwide Interoperability for Microwave Access (WiMAX), Third Generation Partnership Project (3GPP) including Long Term Evolution (LTE) and Long Term Evolution Advanced (LTE-A), and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, Wireless Metropolitan Area Networks (WMAN), Wireless Wide Area Networks (WWAN), ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

FIG. 1 illustrates a top level system diagram 100 of one exemplary embodiment consistent with the present disclosure. Wireless communication devices with transport mechanism selection circuit 102 may communicate with each other through wireless communication links 106. The wireless communication links 106 may be direct links between the devices 102 or may go through a WiFi infrastructure Access Point (AP) 104.

In some embodiments, the devices 102 may be mobile wireless communication devices and the communication may be initiated by an event known as "Tap and Share," wherein the devices come into contact with each other (touch or tap) or simply come into close proximity. The transport mechanism selection circuit of devices 102, as will be explained in greater detail below, selects a transport mechanism and associated class of wireless communication link 106 that provides improved transfer speed with reduced user interaction or involvement.

Figure 2:
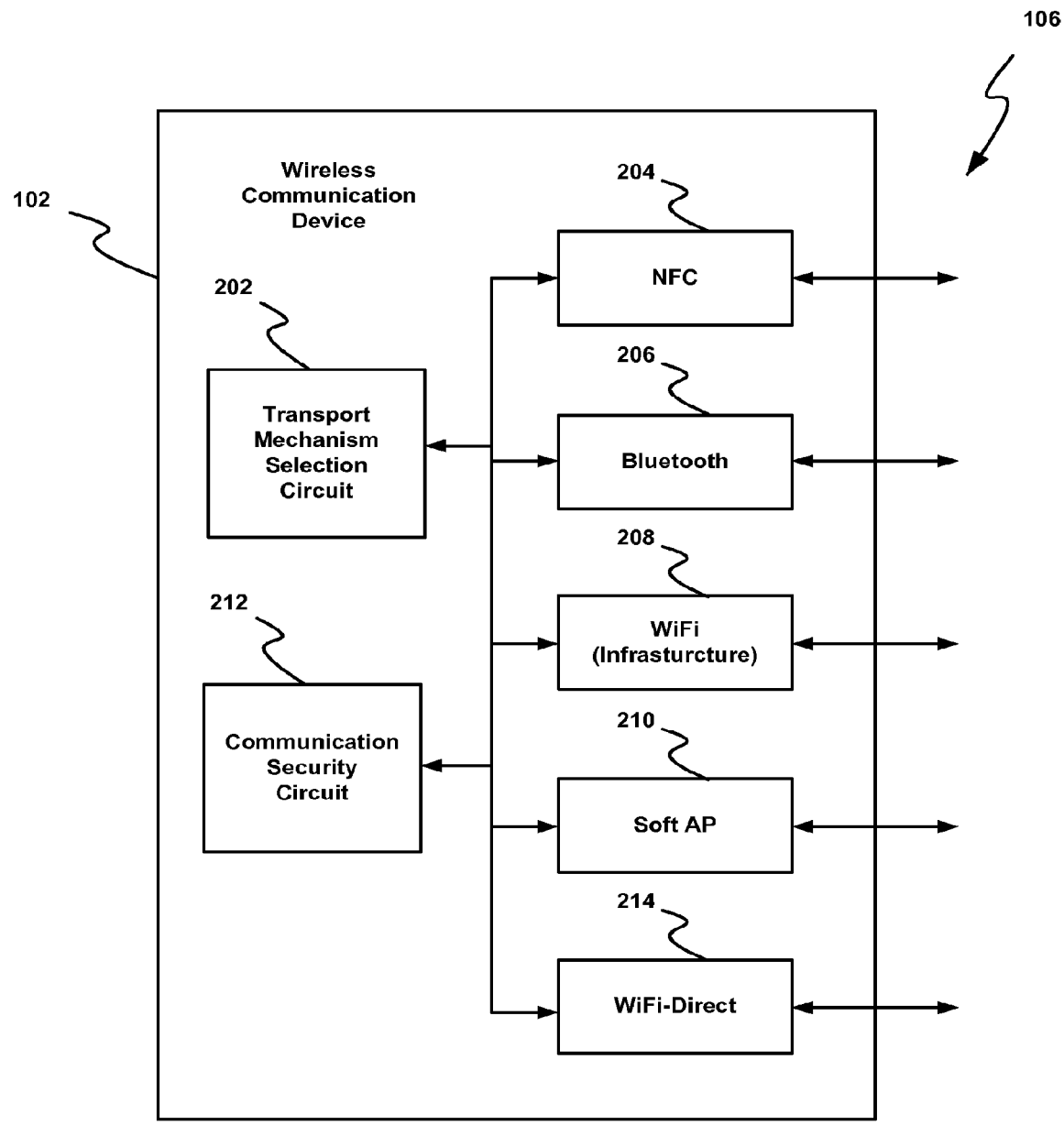
FIG. 2 illustrates a block diagram of one exemplary embodiment consistent with the present disclosure.
Figure 3:
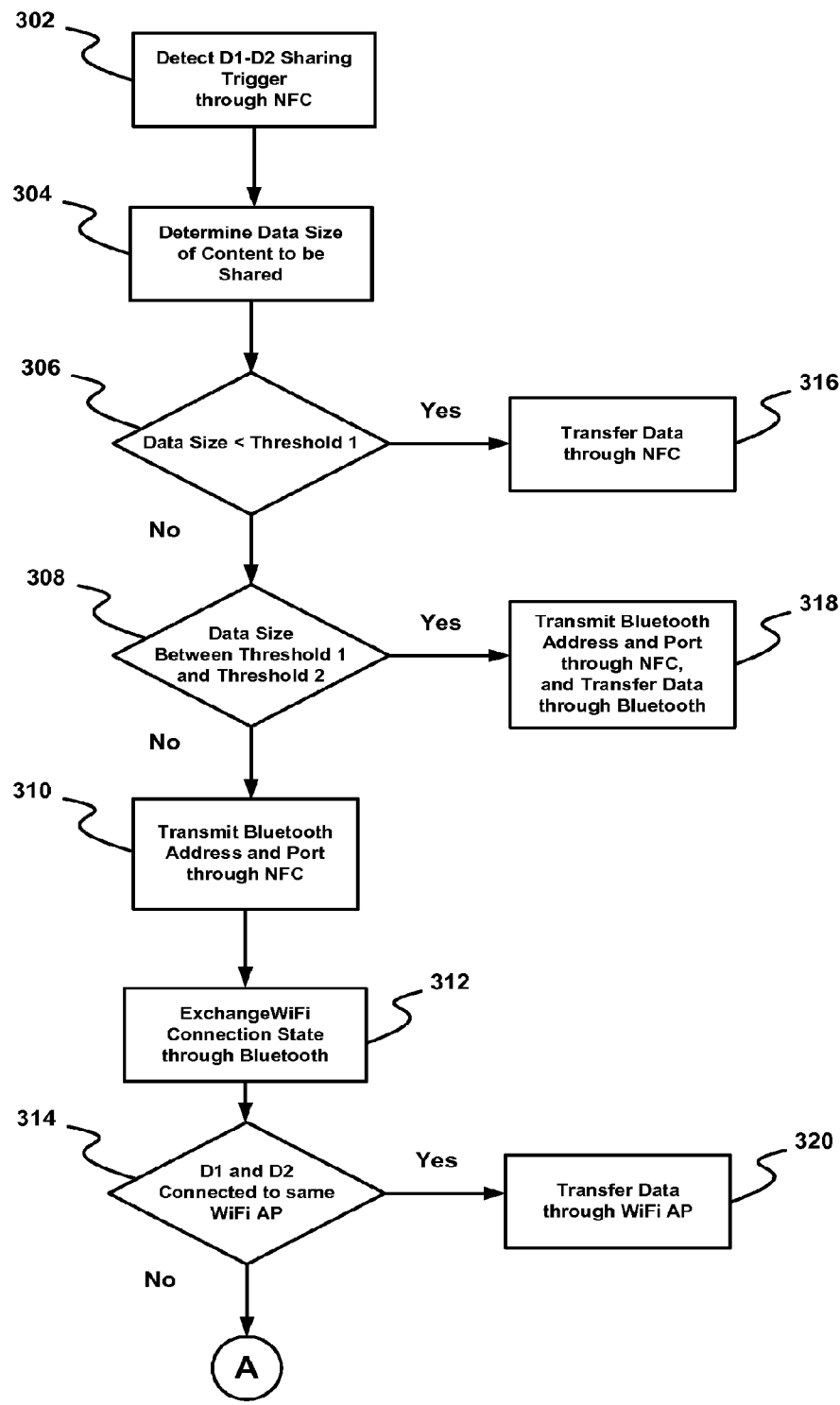
FIG. 3 illustrates a flowchart of operations of an exemplary embodiment consistent with the present disclosure.

FIG. 2 illustrates a block diagram 200 of one exemplary embodiment consistent with the present disclosure. Wireless communication device with transport mechanism selection circuit 102 is shown in greater detail. Transport mechanism selection circuit 202 is coupled to a number of wireless transport communication circuits including NFC communication circuit 204, Bluetooth communication circuit 206, WiFi (Infrastructure) communication circuit 208, Soft AP communication circuit 210 and WiFi-Direct communication circuit 214.

Typical WiFi communications use an existing WiFi infrastructure where dedicated WiFi APs, such as 104 in FIG. 1, provide a communications link between two WiFi enabled devices. Alternatively, both Soft AP and WiFi-Direct, although using different technology and protocols, provide the similar capability for a device to host its own AP such that other WiFi enabled devices may communicate directly with it. Soft APs, which may be run on a mobile device, simulate infrastructure WiFi APs, but with reduced capabilities. Typically, Soft APs are used to provide "portable hot-spot" or "tethering" capabilities where, for example, a laptop can gain internet access through a smartphone. Embodiments of the present disclosure, however, may use Soft APs for point to point communications between two mobile devices. A first device starts a Soft AP and sends access credentials to a second device through a secure data transport. The second device may then use those credentials to connect to the first device and exchange data in a point to point manner. WiFi-Direct technology also provides point to point communication, but in this case one device acts as a WiFi-Direct Group Owner (as opposed to hosting a Soft AP) while the other device acts as a WiFi-Direct client in that group. The process of determining the Group Owner may be done through negotiation or autonomously. The resulting WiFi-Direct point to point communications may be similar in many respects to Soft AP. Dialog box prompting steps, however, which may typically be required in traditional WiFi-Direct connection set up, may be avoided in some embodiments of the present disclosure since authentication and security key sharing can be accomplished over an initial NFC connection that is established when the devices tap.

Each of the available transport mechanisms have relative advantages and disadvantages such as, for example, data transfer speed, effective distance, power consumption, overhead for setup and tear down, security and credentialing requirements. For instance, WiFi is generally faster than BT which, in turn, is generally faster than NFC. Overhead and power consumption, however, is generally greater with WiFi than with BT or NFC. Transport mechanism selection circuit 202 selects from among the available transport mechanisms based on considerations including the size of the data file, the state of existing connections and the availability of access credentials. The selection attempts to increase transfer speed and power consumption efficiency while reducing requirements for user interaction associated with the transfer.

In some embodiments, communication security circuit 212 may generate random keys that are provided to devices 102 for encryption and decryption of data as will be explained in greater detail below.

The wireless transport communication circuits, NFC circuit 204, Bluetooth circuit 206, WiFi (Infrastructure) circuit 208, Soft AP circuit 210 and WiFi-Direct circuit 214, may comprise additional hardware, firmware and/or software elements. For example, an antenna may be provided to transmit and receive signals and a transceiver circuit may be provided to frequency convert and modulate/demodulate the signals and perform any other suitable signal processing. Some of these communication circuits may further include a Medium Access Controller (MAC) processing module to handle channel access control mechanisms associated with the data link layer of the network and interface between the data layer and the physical layer of the network. In some embodiments, one or more of these elements may be shared between communication circuits. In some further embodiments, the NFC circuit 204 may comprise a loop antenna and communication may be accomplished through magnetic induction between loop antennas in the two devices.

FIGS. 3-7 illustrate a flowchart of operations 300-700 of an exemplary embodiment consistent with the present disclosure. In the discussion that follows, the devices for which data will be shared are designated D1 and D2 for convenience, and the direction of data transfer will be considered to be from D1 to D2 although this is not meant to imply any limitation on the direction of data transfer. Beginning with operation 302 of FIG. 3, the NFC communication circuits of D1 and D2 detect the presence of the other device either in proximity (within a predefined threshold distance) or through a physical contact (or tap). This detection may then trigger the data sharing operations that follow. In some embodiments, the devices may need to be pre-enabled by the user for sharing and the particular data to be shared may have been pre-selected.

At operation 304, the size of the data content to be shared or transferred is determined and if it is less than a first pre-determined threshold (operation 306) the data may be transferred through the NFC communication circuit (operation 316). If the data size is greater than the first pre-determined threshold but less than a second pre-determined threshold (operation 308) then BT address and port information may be exchanged over the NFC circuit to establish a BT connection and then data may be transferred through the BT communication circuit (operation 318). If the data size is greater than the second pre-determined threshold then an attempt may be made to transfer the data through WiFi as will be explained in greater detail below.

The thresholds may be determined based on operational measurements of data transfer times and power consumption associated with the various transport mechanisms. For instance, smaller sized data transfers may not benefit significantly from the higher speed of WiFi connections since the setup time may be the dominant factor. The reduced power requirements of NFC or BT would, however, be beneficial in that case.

At operation 310, BT address and port information may be exchanged over the NFC circuit to establish a BT connection. Device D1 may also send a shared security key to device D2 to be used for encryption. Then, at operation 312, the existing WiFi connection states, if any, of the devices D1 and D2 may be exchanged through the BT communication circuit. Connection state information generally includes the identity of the current AP (if any) to which the device is connected and the identity of any APs for which the device has access credentials. In some embodiments, WiFi connection states may include infrastructure WiFi, Soft AP and WiFi-Direct connection states.

If both D1 and D2 are connected to the same WiFi AP (operation 314) then the data may be transferred through the WiFi AP (operation 320).

Figure 4:
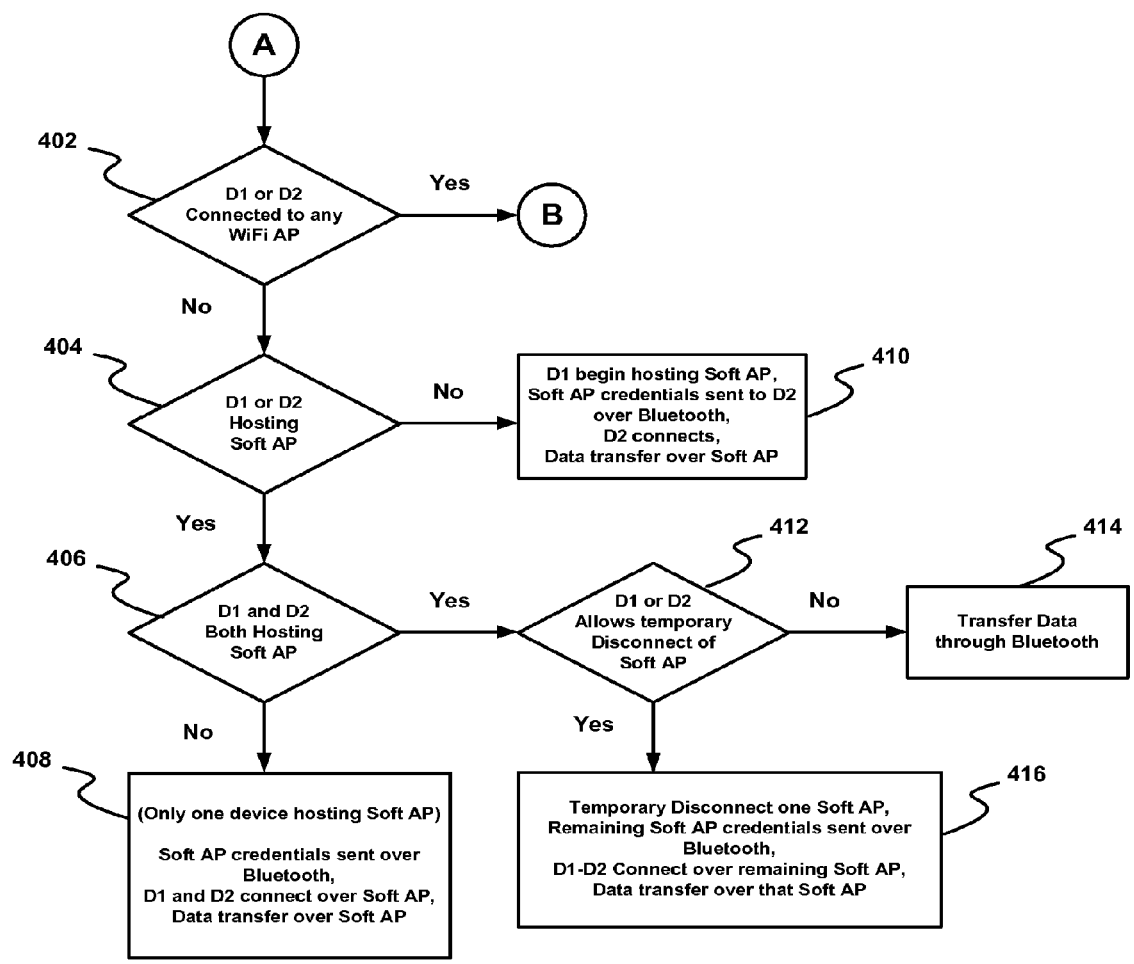
FIG. 4 illustrates a continuation of the flowchart of operations of an exemplary embodiment consistent with the present disclosure.

Turning attention now to FIG. 4, if neither D1 nor D2 are connected to any WiFi AP (operation 402), a determination is made (operation 404) as to whether D1 or D2 is hosting a Soft AP. If neither device is hosting a Soft AP then D1 may begin hosting a Soft AP, the Soft AP credentials may be sent to D2 over BT, D2 may connect to that Soft AP as a client and the data transfer may occur over that Soft AP (operation 410).

If only one device is hosting a Soft AP then, the Soft AP credentials may be sent to the other device over BT, the other device may connect to that Soft AP and the data transfer may occur over that Soft AP (operation 408). If both devices are hosting a Soft AP then a determination is made as to whether either device will permit a temporary disconnect of that device's Soft AP (operation 412).

In some embodiments, the determination of disconnect permission may be made by prompting the user of the device. If a temporary disconnect is permitted, then that device will disconnect and reconnect to the other device's Soft AP, after receiving the Soft AP credentials over BT, and the data transfer may occur over that Soft AP (operation 416). After the data transfer is completed, the original Soft AP connection may be restored. If neither device will permit a temporary disconnect then the data transfer may occur over the Bluetooth communication circuit (operation 414).

Figure 5:
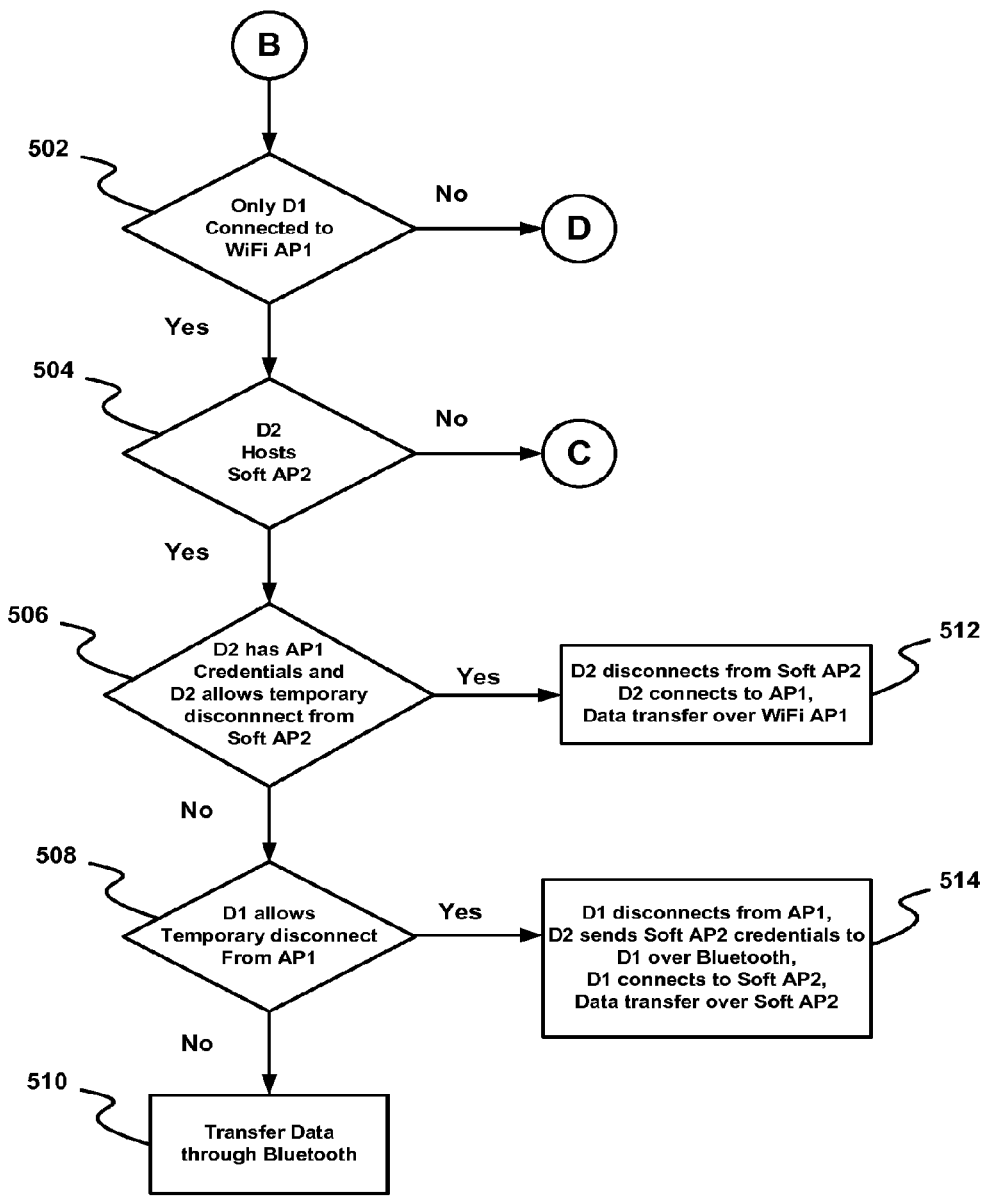
FIG. 5 illustrates a continuation of the flowchart of operations of an exemplary embodiment consistent with the present disclosure.

Turning attention now to FIG. 5, if it is determined that only D1 is connected to a WiFi access point AP1 and D2 is hosting a Soft access point AP2 (operations 502 and 504), then if D2 has credentials to log into AP1 and D2 permits a temporary disconnect of Soft AP2 (operation 506), then D2 may connect to AP1 and the data transfer may occur over AP1 (operation 512). After the data transfer is completed, the original D2 Soft AP2 connection may be restored.

Otherwise, if D1 permits a temporary disconnect from AP1 (operation 508) then D1 may connect to Soft AP2, after receiving the Soft AP2 credentials over BT, and the data transfer may occur over Soft AP2 (operation 514). After the data transfer is completed, the original D1 AP1 connection may be restored. Otherwise, the data transfer may occur over the Bluetooth communication circuit (operation 510).

Figure 6:
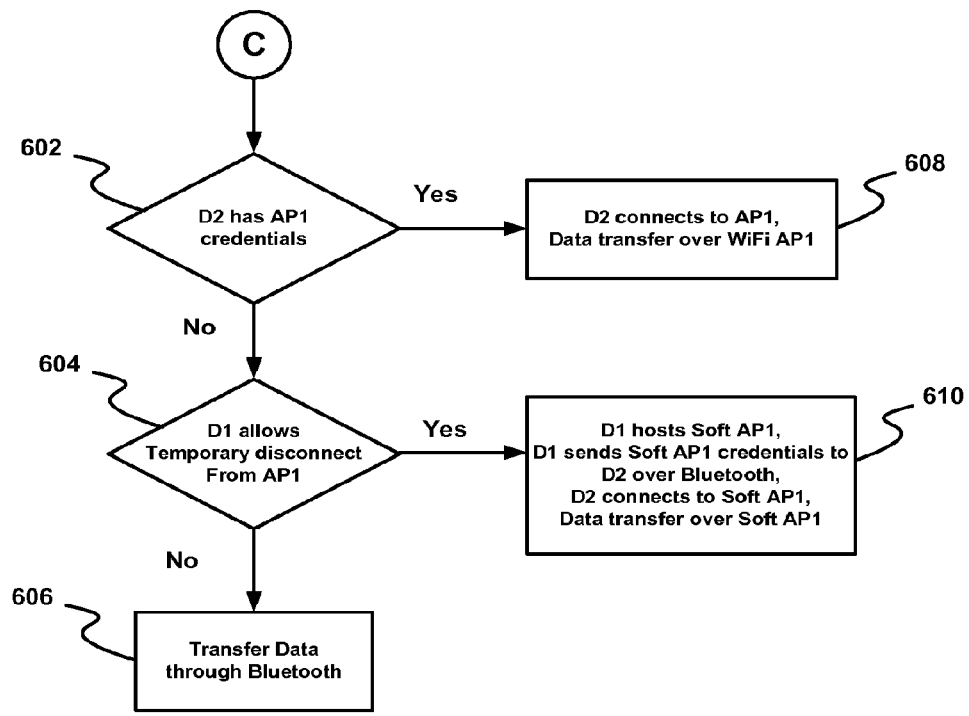
FIG. 6 illustrates a continuation of the flowchart of operations of an exemplary embodiment consistent with the present disclosure.

Turning attention now to FIG. 6, which presents the situation where only D1 is connected to a WiFi AP (AP1) and D2 is not hosting a Soft AP, then if D2 has credentials to log into AP1 (operation 602), then D2 may connect to AP1 and the data transfer may occur over AP1 (operation 608).

Otherwise, if D1 permits a temporary disconnect from AP1 (operation 604) then D1 may begin hosting Soft AP1, D2 may connect to Soft AP1, after receiving the Soft AP1 credentials over BT, and the data transfer may occur over Soft AP1 (operation 610). After the data transfer is completed, the original D1 AP1 connection may be restored. Otherwise, the data transfer may occur over the Bluetooth communication circuit (operation 606).

Figure 7:
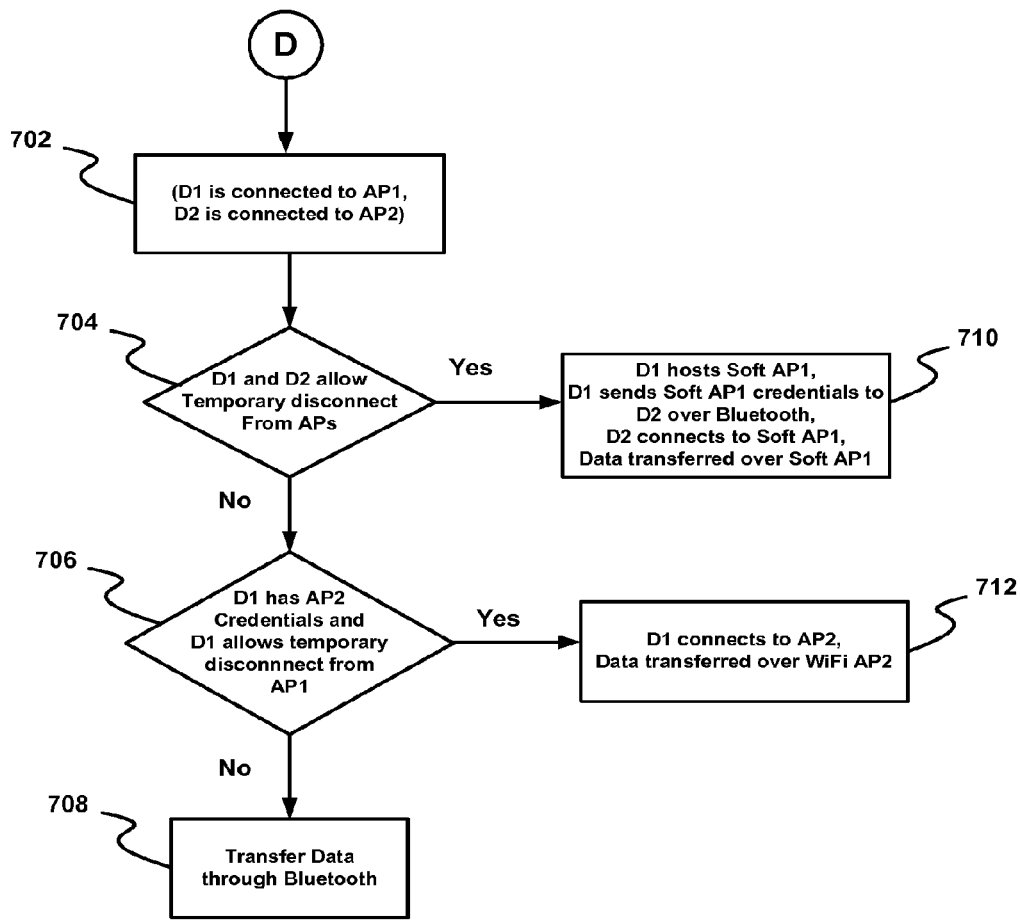
FIG. 7 illustrates a continuation of the flowchart of operations of an exemplary embodiment consistent with the present disclosure.

Turning attention now to FIG. 7, which presents the situation where D1 is connected to AP1 and D2 is connected to AP2, if both D1 and D2 permit temporary disconnects from AP1 and AP2 respectively (operation 704), then D1 may begin hosting Soft AP1, D2 may connect to Soft AP1 , after receiving the Soft AP1 credentials over BT, and the data transfer may occur over Soft AP1 (operation 710). After the data transfer is completed, the original D1 AP1 and D2 AP2 connections may be restored.

Otherwise, if D1 permits a temporary disconnect from AP1 and D1 has credentials to log into AP2 (operation 706) then D1 may connect to AP2 and the data transfer may occur of AP2 (operation 712). After the data transfer is completed, the original D1 AP1 connection may be restored. Otherwise, the data transfer may occur over the Bluetooth communication circuit (operation 708).

In some embodiments, connection state information may be exchanged securely through NFC communications, particularly if the devices support Simple NFC Data Exchange Format (NDEF) Exchange Protocol (SNEP). If the devices do not support SNEP, then the exchange of connection state may be performed securely over BT with the aid of a random key that is generated by one of the devices and transmitted to the other device over NFC during the initial device "tap." The random key, which is known only to the two devices, may be used to encrypt and decrypt the messages sent over BT or WiFi-Direct, depending on the transport mechanism selection.

It may be understood that in some embodiments, the WiFi-Direct data transport mechanism may be employed in a manner similar to that described above for Soft AP, where one device acts as a WiFi-Direct Group Owner (as opposed to hosting a Soft AP) while the other device acts as a WiFi-Direct client. The process for WiFi-Direct communications may be similar in most respects to Soft AP since conventional WiFi-Direct dialog boxes may be eliminated based on the shared security key that is transferred through the NFC connection as described above.

Figure 8:
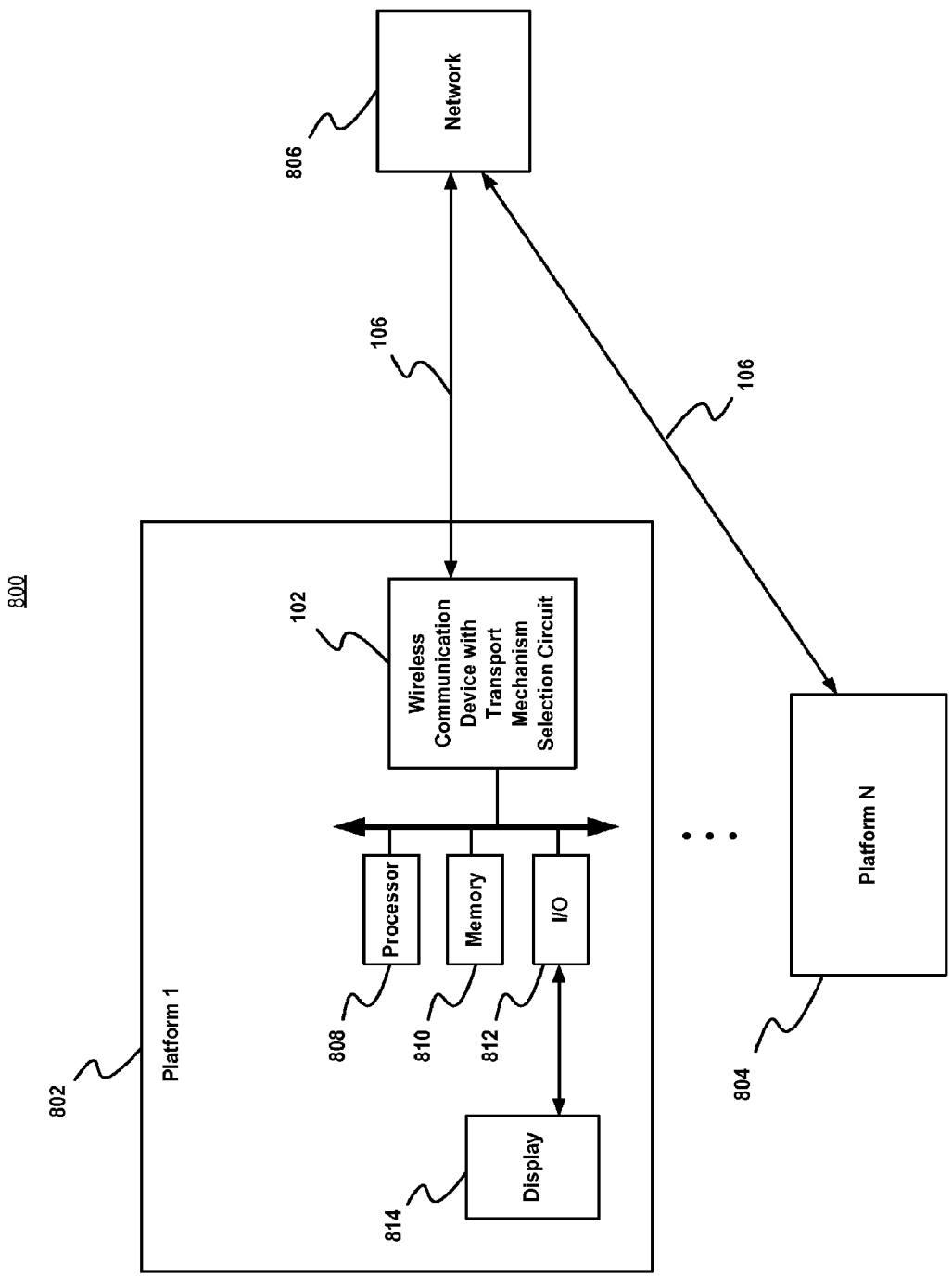
FIG. 8 illustrates a system diagram showing platforms consistent with an exemplary embodiment of the present disclosure in a network.

FIG. 8 illustrates a system diagram 800 showing platforms consistent with an exemplary embodiment of the present disclosure in a network. A platform 802, 804 may be a mobile communication device, such as, for example, a smartphone, a tablet, a laptop computing device or any other device configured to transmit or receive wireless signals. In some embodiments, platforms 802, 804 may comprise a processor 808, memory 810, an input/output (I/O) system 812, a display 814 or other type of user interface (UI) such as, for example, a touchscreen. Platforms 802, 804 may also comprise a wireless communications device with transport mechanism selection circuit 102 as described above, which may select among available transport mechanisms including NFC, BT, WiFi infrastructure, Soft AP and WiFi-Direct communications. Any number of platforms 802, 804 may transmit or receive signals 106 over a network 806. In some embodiments, network 608 may be a WiFi infrastructure network, a Soft AP or a WiFi-Direct network.

Figure 9:
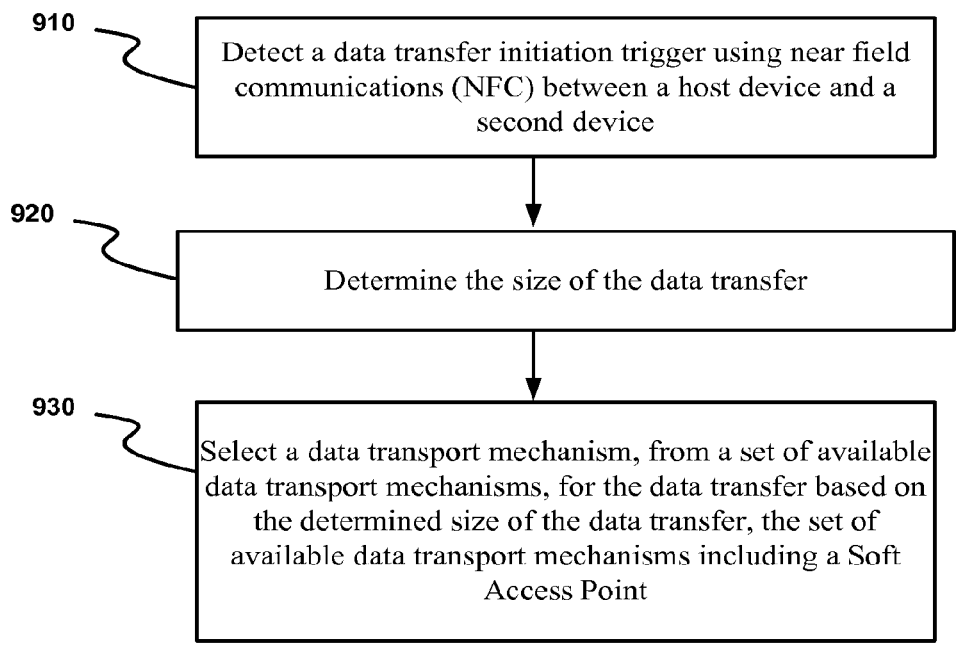
FIG. 9 illustrates a flowchart of operations of another exemplary embodiment consistent with the present disclosure.

FIG. 9 illustrates a flowchart of operations 900 of an exemplary embodiment consistent with the present disclosure. At operation 910, a data transfer initiation trigger is detected using NFC communications between a host device and a second device. The trigger may be based on proximity between the devices. At operation 920, the size of the data transfer is determined. At operation 930, a data transport mechanism for the data transfer is selected, from a set of available data transport mechanisms, based on the determined size of the data transfer. The set of available data transport mechanisms includes a Soft AP. Other data transport mechanisms available for selection may include BT, Infrastructure WiFi, WiFi-Direct and NFC communications. Credential information for the Soft AP may be securely exchanged between the devices using BT. The selection of the data transport mechanism may also be based on WiFi and/or Soft AP connection status of the devices, available credentials of the devices and the ability of the devices to temporarily disconnect from existing WiFi and/or Soft AP connections.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides a device, method and system for secure wireless data transfer between communication devices with improved data transport mechanism selection.

The device may include a near field communication (NFC) circuit configured to initiate a data transfer between the communication device and a second communication device. The device of this example may also include a Soft Access Point (Soft AP) data transport circuit configured to transfer data between the communication device and the second communication device. The device of this example may further include one or more additional data transport circuits configured to transfer data between the communication device and the second communication device. The device of this example may further include a transport mechanism selection circuit coupled to the NFC interface circuit and further coupled to the one or more data transport circuits, the transport mechanism selection circuit configured to select one of the data transport circuits for the data transfer, and the selection is based on a determination of the size of the data transfer.

Another example device includes the forgoing components and the one or more additional data transport circuits further include a Bluetooth (BT) communication circuit, an infrastructure WiFi communication circuit, a WiFi-Direct communication circuit, and the NFC circuit.

Another example device includes the forgoing components and the BT communication circuit is further configured to securely exchange credential information with the second communication device, the credential information associated with the Soft AP.

Another example device includes the forgoing components and the selection is further based on WiFi connection state information and Soft AP connection state information associated with the communication device and the second communication device.

Another example device includes the forgoing components and the BT communication circuit is further configured to securely exchange the connection state information with the second communication device.

Another example device includes the forgoing components and the selection is further based on determining ability to disconnect an existing WiFi connection or Soft AP connection.

Another example device includes the forgoing components and the NFC circuit is further configured to initiate the data transfer based on proximity of the communication device and the second communication device.

Another example device includes the forgoing components and further includes a communication security circuit configured to generate a random key and the random key is provided to the communication device and the second communication device for encryption and decryption of data transfers through the BT communication circuit and/or the WiFi-Direct communication circuit.

According to another aspect there is provided a method. The method may include detecting a data transfer initiation trigger using near field communications (NFC) between a host device and a second device. The method of this example may also include determining the size of the data transfer. The method of this example may further include selecting a data transport mechanism, from a set of available data transport mechanisms, for the data transfer based on the determined size of the data transfer, and the set of available data transport mechanisms includes a Soft Access Point (Soft AP).

Another example method includes the forgoing operations and the set of available data transport mechanisms further include Bluetooth (BT), Infrastructure WiFi, WiFi-Direct and the NFC.

Another example method includes the forgoing operations and further includes securely exchanging credential information between the host device and the second device using the BT data transport mechanism, the credential information associated with the Soft AP.

Another example method includes the forgoing operations and further includes exchanging WiFi connection state information and Soft AP connection state information between the host device and the second device, and the data transport mechanism selection is further based on the connection state information.

Another example method includes the forgoing operations and further includes securely exchanging the connection state information between the host device and the second device using the BT data transport mechanism.

Another example method includes the forgoing operations and the selection is further based on determining ability to disconnect an existing WiFi connection or Soft AP connection.

Another example method includes the forgoing operations and the detecting of the data transfer initiation trigger is based on proximity of the host device and the second device.

Another example method includes the forgoing operations and further includes generating a random key and transmitting the random key from the host device to the second device, and the random key is used for encryption and decryption of data transfers through the BT communications and/or the WiFi-Direct communications.

According to another aspect there is provided at least one computer-readable storage medium having instructions stored thereon which when executed by a processor, cause the processor to perform the steps of the method as described in the examples above.

According to another aspect there is provided a mobile communication platform. The platform may include a processor, a memory coupled to the processor, an input/output (I/O) system coupled to the processor, a display coupled to the I/O system and a wireless communication device. The wireless communication device of this example may also include a near field communication (NFC) circuit configured to initiate a data transfer between the communication device and a second communication device. The wireless communication device of this example may further include a Soft Access Point (Soft AP) data transport circuit configured to transfer data between the communication device and the second communication device. The wireless communication device of this example may further include one or more additional data transport circuits configured to transfer data between the communication device and the second communication device. The wireless communication device of this example may further include a transport mechanism selection circuit coupled to the NFC interface circuit and further coupled to the one or more data transport circuits, the transport mechanism selection circuit configured to select one of the data transport circuits for the data transfer, and the selection is based on a determination of the size of the data transfer.

Another example platform includes the forgoing components and the one or more additional data transport circuits further include a Bluetooth (BT) communication circuit, an infrastructure WiFi communication circuit, a WiFi-Direct communication circuit and the NFC circuit.

Another example platform includes the forgoing components and the BT communication circuit is further configured to securely exchange credential information with the second communication device, the credential information associated with the Soft AP.

Another example platform includes the forgoing components and the selection is further based on WiFi connection state information and Soft AP connection state information associated with the communication device and the second communication device.

Another example platform includes the forgoing components and the BT communication circuit is further configured to securely exchange the connection state information with the second communication device.

Another example platform includes the forgoing components and the NFC circuit is further configured to initiate the data transfer based on proximity of the communication device and the second communication device.

Another example platform includes the forgoing components and further includes including a communication security circuit configured to generate a random key and the random key is provided to the communication device and the second communication device for encryption and decryption of data transfers through the BT communication circuit and/or the WiFi-Direct communication circuit.

Another example platform includes the forgoing components and the platform is one of a smartphone, a tablet or a laptop computing device.

Another example platform includes the forgoing components and further includes a plurality of the platforms each configured to communicate over a wireless network.

Another example platform includes the forgoing components and the display is a touchscreen.

According to another aspect there is provided a system. The system may include means for detecting a data transfer initiation trigger between a host device and a second device. The system of this example may also include means for selecting a data transport mechanism, from a set of available data transport mechanisms, for the data transfer, and the set of available data transport mechanisms includes a Soft AP.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A mobile communication device comprising:
    a Bluetooth communication circuit to initiate a data transfer between said mobile communication device and a remote communication device;
    a near field communication (NFC) circuit;
    one or more high-speed communication circuits, including at least one of:
        an infrastructure WiFi communication circuit;
        a WiFi Direct communication circuit; or
        a soft access point (Soft AP) communication circuit; and
    a transport mechanism selection circuit to determine a size of said data transfer relative to a first threshold and a second threshold, where said second threshold is greater than said first threshold, and:
        if the size of said data transfer is less than said first threshold, to select said NFC circuit for completion of said data transfer by said NFC circuit;
        if the size of said data transfer is greater than said first threshold and less than said second threshold, to select said BT communication circuit for completion of said data transfer by said BT communication circuit;
        if the size of said data transfer is greater than said second threshold, to select said BT communication circuit to securely exchange credential information with said remote communication device, said credential information associated with said high-speed communication circuits, and to select one of said high-speed communication circuits for completion of said data transfer, if one or more of said high-speed communication circuits are available; and
        if the size of said data transfer is greater than said second threshold but no high-speed communication circuit is available, to select said BT communication circuit for completion of said data transfer by said BT communication circuit.

2. The mobile communication device of claim 1, wherein said data transport selection circuit is further to determine if one or more of said high-speed communication circuits are available based at least in part on WiFi connection state information and Soft AP connection state information associated with said mobile communication device and said remote communication device.

3. The mobile communication device of claim 2, wherein said Bluetooth communication circuit is further to securely exchange said connection state information with said remote communication device.

4. The mobile communication device of claim 1, wherein said data transport mechanism selection circuit is further to determine an ability of said remote communication device to disconnect from an existing connection, and to determine if one or more of said high-speed communication circuits are available based at least in part on a determined ability of said remote communication device to disconnect from an existing connection.

5. The mobile communication device of claim 1, further comprising a communication security circuit to generate a random key wherein said random key is provided to said mobile communication device and said remote communication device for encryption and decryption of data transfers.

6. A method for wireless data transfer, said method comprising:

detecting, with Bluetooth communication, a data transfer initiation trigger between a mobile communication device and a remote communication device, the mobile communication device comprising a Bluetooth (BT) communication circuit to transfer data between said mobile communication device and said remote communication device, a near field communication (NFC) circuit, and one or more high-speed communication circuits, including at least one of:
  Infrastructure WiFi communication;
  WiFi-Direct communication; or
  Soft Access Point (Soft AP) communication;
determining a size of said data transfer with the lest mobile communication device relative to a first threshold and a second threshold, where said second threshold is greater than said first threshold; and:
  if the size of said data transfer is less than said first threshold, selecting said NFC circuit for completion of said data transfer by said NFC circuit;
  if the size of said data transfer is greater than said first threshold and less than said second threshold, selecting said BT communication circuit for completion of said data transfer by said BT communication circuit;
  if the size of said data transfer is greater than said second threshold, selecting said BT communication circuit to securely exchange credential information with said remote communication device, said credential information associated with said high-speed communication circuits, and selecting one of said high-speed communication circuits for completion of said data transfer if one or more of said high-speed communication circuits are available; and
  if the size of said data transfer is greater than said second threshold but no high-speed communication circuit is available, selecting said BT communication circuit for completion of said data transfer by said BT communication circuit.

7. The method of claim 6, further comprising transmitting said data transfer initiation trigger between the mobile communication device and the remote communication device using said Bluetooth communication.

8. The method of claim 7, further comprising:
generating a random key with said mobile communication device; and
transmitting said random key from said mobile communication device to said remote communication device;
wherein said random key is to be used by said remote communication device and said mobile communication device to encrypt and decrypt said data transfer, respectively.

9. The method of claim 6, further comprising:
exchanging WiFi connection state information and Soft AP connection state information between said mobile communication device and said remote communication device;
determining if one or more of said high-speed communication circuits are available based at least in part on said WiFi connection state information and said Soft AP connection state information.

10. The method of claim 9, further comprising transmitting said data transfer initiation trigger using said Bluetooth communication, and securely exchanging said connection state information between said mobile communication device and said remote communication device using said Bluetooth communication.

11. A non-transitory computer-readable storage medium having instructions stored thereon which when executed by a processor result in the following operations for wireless data transfer, said operations comprising:
  detecting, with Bluetooth communication, a data transfer initiation trigger between a mobile communication device and a remote communication device, the mobile communication device comprising a NFC circuit to transfer data between said mobile communication device and said remote communication device, a Bluetooth (BT) communication circuit, and one or more high-speed communication circuits including at least one of:
    Infrastructure WiFi communication;
    WiFi-Direct communication; or
    Soft Access Point (Soft AP) communication;
  determining a size of said data transfer with the mobile communication device relative to a first threshold and a second threshold, where said second threshold is greater than said first threshold; and:
    if the size of said data transfer is less than said first threshold, selecting said NFC circuit for completion of said data transfer by said NFC circuit;
    if the size of said data transfer is greater than said first threshold and less than said second threshold, selecting said BT communication circuit for completion of said data transfer by said BT communication circuit; and
    if the size of said data transfer is greater than said second threshold, selecting said BT communication circuit to securely exchange credential information with said remote communication device, said credential information associated with said high-speed communication circuits, and selecting one of said high-speed communication circuits for completion of said data transfer if one or more of said high-speed communication circuits are available; and
    if the size of said data transfer is greater than said second threshold but no high-speed communication circuit is available, selecting said BT communication circuit for completion of said data transfer by said BT communication circuit.

12. The non-transitory computer-readable storage medium of claim 11, wherein said operations further comprise transmitting said data transfer initiation trigger between the mobile communication device and the remote communication device using said Bluetooth communication.

13. The non-transitory computer-readable storage medium of claim 11, wherein said operations further comprise:
  exchanging WiFi connection state information and Soft AP connection state information between said mobile communication device and said remote communication device; and
  determining if one or more of said high-speed communication circuits are available based at least in part on said WiFi connection state information and said Soft AP connection state information.

14. The non-transitory computer-readable storage medium of claim 13, wherein said operations further comprise:
  transmitting said data transfer initiation trigger using said Bluetooth communication, and
  securely exchanging said connection state information between said mobile communication device and said remote communication device using said Bluetooth communication.

15. The non-transitory computer-readable storage medium of claim 11, wherein said operations further comprise:
 generating a random key with said mobile communication device; and
 transmitting said random key from said mobile communication device to said remote communication device, wherein said random key is used by said remote communication device and said mobile communication device for encryption and decryption of said data transfer, respectively.

16. A mobile communication platform comprising:
 a processor;
 a memory coupled to said processor;
 an input/output (I/O) system coupled to said processor;
 a display coupled to said I/O system; and
 a wireless communication device comprising:
  a Bluetooth communication circuit to initiate a data transfer between said mobile communication platform and a remote communication device;
  a near field communication (NFC) circuit;
  one or more high-speed communication circuits, including at least one of:
   an infrastructure WiFi communication circuit;
   a WiFi Direct communication circuit; or
   a soft access point (soft AP) communication circuit; and
  a transport mechanism selection circuit to determine a size of said data transfer relative to a first threshold and a second threshold, where said second threshold is greater than said first threshold, and:
   if the size of said data transfer is less than said first threshold, to select said NFC circuit for completion of said data transfer by said NFC circuit,
   if the size of said data transfer is greater than said first threshold and less than said second threshold, to select said BT communication circuit for completion of said data transfer by said BT communication circuit,
   if the size of said data transfer is greater than said second threshold, to select said BT communication circuit to securely exchange credential information with said remote communication device, said credential information associated with said high-speed communication circuits, and to select one of said high-speed communication circuits for completion of said data transfer, if one or more of said high-speed communication circuits are available; and
   if the size of said data transfer is greater than said second threshold but no high-speed communication circuit is available, to select said BT communication circuit for completion of said data transfer by said BT communication circuit.

17. The mobile communication platform of claim 16, wherein said data transport selection circuit is further to determine if one or more of said high-speed communication based at least in part on WiFi connection state information and Soft AP connection state information associated with said mobile communication platform and said remote communication device.

18. The mobile communication platform of claim 17, wherein said Bluetooth communication circuit is further to securely exchange said connection state information with said remote communication device.

19. The mobile communication platform of claim 16, wherein said data transport mechanism selection circuit is further to determine an ability of said remote communication device to disconnect from an existing connection, and to determine if one or more of said high-speed communication circuits are available based at least in part on a determined ability of said remote communication device to disconnect from an existing connection.

20. The mobile communication platform of claim 16, further comprising a communication security circuit to generate a random key wherein said random key is provided to said mobile communication platform and said remote communication device for encryption and decryption of data transfers.

* * * * *